US012594990B1

(12) United States Patent
Charbonneau et al.

(10) Patent No.: US 12,594,990 B1
(45) Date of Patent: Apr. 7, 2026

(54) COMMERCIAL ELECTRIC VEHICLE STEERING

(71) Applicant: Harbinger Motors Inc., Garden Grove, CA (US)

(72) Inventors: Alexi Charbonneau, Redondo Beach, CA (US); Soungjin Jason Wou, Novi, MI (US); Kunal Gupta, Tustin, CA (US)

(73) Assignee: Harbinger Motors Inc., Garden Grove, CA (US)

( * ) Notice: Subject to any disclaimer, the term of this patent is extended or adjusted under 35 U.S.C. 154(b) by 0 days.

(21) Appl. No.: 19/202,925

(22) Filed: May 8, 2025

(51) Int. Cl.
   *B62D 7/16* (2006.01)
   *B62D 7/20* (2006.01)

(52) U.S. Cl.
   CPC ...... *B62D 7/16* (2013.01); *B62D 7/20* (2013.01)

(58) Field of Classification Search
   CPC .......... B62D 7/16; B62D 7/20; B62D 5/0421; B62D 3/02; B62D 5/02
   See application file for complete search history.

(56) References Cited

U.S. PATENT DOCUMENTS

| | | | |
|---|---|---|---|
| 2,716,461 | A | 8/1955 | Macpherson |
| 3,709,516 | A | 1/1973 | Ewert |
| 3,952,824 | A | 4/1976 | Matschinsky |
| 5,039,124 | A | 8/1991 | Widmer |
| 5,267,625 | A * | 12/1993 | Shimizu ............... B62D 5/0421 180/443 |
| 5,443,130 | A | 8/1995 | Tanaka et al. |
| 9,050,897 | B1 | 6/2015 | Collins |
| 10,029,551 | B2 | 7/2018 | Ito et al. |
| 10,493,835 | B2 | 12/2019 | Ito et al. |
| 10,766,478 | B2 | 9/2020 | Healy et al. |
| 10,840,488 | B2 | 11/2020 | Izumi et al. |
| 10,913,493 | B2 * | 2/2021 | Pattok ...................... B62D 7/08 |
| 11,161,402 | B2 | 11/2021 | McCarron et al. |
| 11,376,970 | B2 | 7/2022 | Yu |
| 11,414,134 | B2 | 8/2022 | Timofeev et al. |
| 12,011,985 | B2 | 6/2024 | Charbonneau et al. |
| 12,017,520 | B2 | 6/2024 | Charbonneau et al. |
| 2003/0205880 | A1 | 11/2003 | Walker |

(Continued)

FOREIGN PATENT DOCUMENTS

| | | |
|---|---|---|
| CN | 110435381 A | 11/2019 |
| CN | 210416093 A | 11/2019 |

(Continued)

OTHER PUBLICATIONS

U.S. Appl. No. 18/463,117, Non Final Office Action mailed Oct. 23, 2023, 10 pgs.

(Continued)

*Primary Examiner* — Paul N Dickson
*Assistant Examiner* — Shams Dhanani
(74) *Attorney, Agent, or Firm* — Polygon IP, LLP

(57) ABSTRACT

Described herein is a steering system for an electric commercial electric vehicle. The commercial electric vehicle steering system utilizes a recirculating ball steering system with a fixed height idler that allows for control of a track rod to mimic the geometry of a rack and pinion steering system. The fixed height idler includes a ball joint for distance control and a bushing to prevent rotation of the ball joint.

20 Claims, 7 Drawing Sheets

(56)         References Cited

U.S. PATENT DOCUMENTS

| | | | |
|---|---|---|---|
| 2005/0077137 A1 | 4/2005 | Nozaki et al. | |
| 2020/0247224 A1 | 8/2020 | Ito et al. | |
| 2020/0346506 A1 | 11/2020 | Laforce et al. | |
| 2020/0369140 A1 | 11/2020 | McCarron et al. | |
| 2021/0218101 A1 | 7/2021 | Menon et al. | |
| 2022/0032704 A1* | 2/2022 | Desourdy | B60G 7/02 |
| 2022/0032999 A1* | 2/2022 | Soares | B62D 7/20 |
| 2022/0144032 A1 | 5/2022 | Brooks et al. | |
| 2022/0194489 A1 | 6/2022 | Roche et al. | |
| 2022/0289012 A1 | 9/2022 | Kamimae | |
| 2022/0410990 A1 | 12/2022 | Rust | |
| 2024/0083232 A1 | 3/2024 | Charbonneau et al. | |
| 2024/0294058 A1 | 9/2024 | Charbonneau et al. | |
| 2024/0294059 A1 | 9/2024 | Charbonneau et al. | |

FOREIGN PATENT DOCUMENTS

| | | | | |
|---|---|---|---|---|
| EP | 1839906 B1 | 9/2008 | | |
| KR | 20170040881 A * | 4/2017 | | B62D 7/20 |
| KR | 102413236 B1 * | 6/2022 | | B60B 27/00 |
| WO | 2024054908 | 3/2024 | | |

OTHER PUBLICATIONS

U.S. Appl. No. 18/463,117, Notice of Allowance mailed Feb. 14, 2024, 14pgs.

U.S. Appl. No. 18/463,123, Non Final Office Action mailed Nov. 27, 2023, 19 pgs.

U.S. Appl. No. 18/463,123, Notice of Allowance mailed Feb. 22, 2024, 8 pgs.

U.S. Appl. No. 18/662,105, Non Final Office Action mailed Nov. 19, 2024, 17 pgs.

U.S. Appl. No. 18/662,105, Notice of Allowance mailed Mar. 12, 2025, 13 pgs.

International Application Serial No. PCT/US23/73638, International Preliminary Report on Patentability mailed Mar. 20, 2025, 9 pgs.

International Application Serial No. PCT/US23/73638, Search Report and Written Opinion mailed Jan. 2, 2024, 13 pgs.

Weicker et al., "Commercial Electric Vehicle Front Suspension Structure," U.S. Appl. No. 18/974,454, filed Dec. 9, 2024.

Wikipedia, "Constant Velocity Joint", 6 pages, retrieved Oct. 18, 2023. [https://en.wikipedia.org/wiki/Constant-velocityjoint] (Year: 2023).

* cited by examiner

COMMERCIAL ELECTRIC VEHICLE STEERING

BACKGROUND

Commercial vehicles typically utilize solid axle suspension. A few commercial vehicle models have independent front suspension, but, due to geometry constraints on the arrangement of the commercial vehicle ladder frame, those vehicles typically utilize either swing axle suspensions or a variation thereof, such as twin I-beam style suspension. Swing axle suspensions, while independent, are non-ideal from a vehicle dynamic standpoint. Due to the solid axle front suspension, commercial vehicles typically are unable to utilize rack and pinion steering systems due to geometric incompatibility and lack of robustness for such systems.

SUMMARY

Described herein are commercial electric vehicle steering systems that utilize a recirculating ball steering system in a manner similar to rack and pinion steering geometry, to provide a user friendly experience with accurate steering. In certain embodiments, the steering system may include an idler opposite the recircuiting ball steering system, with links that couple the idler and the recircuiting ball steering system to a track rod. Tie rods may be coupled to the track rod. Such a configuration may provide for a recirculating ball steering that is similar in geometry to a rack and pinion system.

These and other embodiments are described further below with reference to the figures.

CLAUSES

Clause 1. A commercial electric vehicle steering system (500) comprising: a recirculating ball steering unit (440), configured to be coupled to a commercial electric vehicle frame (102) and comprising a rotatable output shaft (442) configured to rotate around an output axis (402); a first tie rod (454); a second tie rod (456); a track rod (448), comprising: a first end (408) coupled to the first tie rod (454); a second end (410) coupled to the second tie rod (456); a pitman attachment (412), disposed between the first end and the second end; and an idler attachment (414), disposed between the first end and the second end; a pitman arm (470), coupled to the rotatable output shaft (442) and the pitman attachment (412); an idler arm (472), coupled to the idler attachment (414); and a steering idler (444), comprising: a steering idler ball joint (446) comprising: an idler ball stud (660), configured to couple to the commercial electric vehicle frame (102) and comprising a steering idler ball (690); and a stud shaft (692), the stud shaft (692) coupled to the idler arm (472) and configured to rotate around a stud axis (404), the stud axis (404) disposed substantially laterally in line (498) with the output axis (402); a substantially cylindrical sidewall (664), enclosing at least a portion (684) of the stud shaft (692); and a bushing (666), coupled to the stud shaft (692) and the substantially cylindrical sidewall (664), containing an outside diameter of the stud shaft, and configured to prevent angular rotation (686) of the idler ball stud (660).

Clause 2. The commercial electric vehicle steering system (500) of clause 1, wherein the steering idler ball joint (446) further comprises an idler ball socket (662), wherein the steering idler ball (690) is disposed within the idler ball socket (662).

Clause 3. The commercial electric vehicle steering system (500) of clause 2, wherein the idler ball socket (662) is configured to be disposed proximate the commercial electric vehicle frame (102).

Clause 4. The commercial electric vehicle steering system (500) of clause 1, wherein the idler arm (472) is coupled to the idler attachment (414) with an idler arm ball joint (452).

Clause 5. The commercial electric vehicle steering system (500) of clause 4, wherein a first distance (516) between the output axis (402) and the pitman attachment (412) is substantially similar to a second distance (518) between the stud axis (404) and the idler attachment (414).

Clause 6. The commercial electric vehicle steering system (500) of clause 5, wherein the pitman arm (470) is coupled to the pitman attachment (412) with a pitman arm ball joint (450).

Clause 7. The commercial electric vehicle steering system (500) of clause 6, wherein the idler arm ball joint (452) comprises: an idler arm ball (668A), disposed within an idler socket (606A) of the idler arm (472); and an idler arm shaft (696A), coupled to the idler attachment (414).

Clause 8. The commercial electric vehicle steering system (500) of clause 7, wherein the idler socket (606A) comprises a lip (674A) configured to allow less than 2 degrees of angular rotation (688) for the idler arm ball joint (452).

Clause 9. The commercial electric vehicle steering system (500) of clause 6, wherein the pitman arm ball joint (450) comprises: a pitman arm ball (668B), disposed within a pitman socket (606B) of the pitman arm (470); and a pitman arm shaft (696B), coupled to the pitman attachment (412).

Clause 10. The commercial electric vehicle steering system (500) of clause 1, wherein at least a portion of the stud shaft (692) is non-tapered.

Clause 11. A commercial electric vehicle (100) comprising: a commercial electric vehicle frame (102); a first suspension (400), comprising: a first tie rod (454); a second tie rod (456); and a commercial electric vehicle steering system, comprising: a recirculating ball steering unit (440), coupled to the commercial electric vehicle frame (102) and comprising a rotatable output shaft (442) configured to rotate around an output axis (402); a track rod (448), comprising: a first end (408) coupled to the first tie rod (454); a second end (410) coupled to the second tie rod (456); a pitman attachment (412), disposed between the first end and the second end; and an idler attachment (414), disposed between the first end and the second end; a pitman arm (470), coupled to the rotatable output shaft (442) and the pitman attachment (412); an idler arm (472), coupled to the idler attachment (414); and a steering idler (444), comprising: a steering idler ball joint (446) comprising: an idler ball stud (660), coupled to the commercial electric vehicle frame (102) and comprising a steering idler ball (690); and a stud shaft (692), the stud shaft (692) coupled to the idler arm (472) and configured to rotate around a stud axis (404), the stud axis (404) disposed substantially laterally in line (498) with the output axis (402); a substantially cylindrical sidewall (664), enclosing at least a portion (684) of the stud shaft (692); and a bushing (666), coupled to the stud shaft (692) and the substantially cylindrical sidewall (664), containing an outside diameter of the stud shaft, and configured to prevent angular rotation (686) of the idler ball stud (660).

Clause 12. The commercial electric vehicle (100) of clause 11, wherein the steering idler ball joint (446) further comprises an idler ball socket (662), wherein the steering idler ball (690) is disposed within the idler ball socket (662).

Clause 13. The commercial electric vehicle (100) of clause 12, wherein the idler ball socket (662) is disposed proximate the commercial electric vehicle frame (102).

Clause 14. The commercial electric vehicle (100) of clause 11, wherein the idler arm (472) is coupled to the idler attachment (414) with an idler arm ball joint (452).

Clause 15. The commercial electric vehicle (100) of clause 14, wherein a first distance (516) between the output axis (402) and the pitman attachment (412) is substantially similar to a second distance (518) between the stud axis (404) and the idler attachment (414).

Clause 16. The commercial electric vehicle (100) of clause 15, wherein the pitman arm (470) is coupled to the pitman attachment (412) with a pitman arm ball joint (450).

Clause 17. The commercial electric vehicle (100) of clause 16, wherein the idler arm ball joint (452) comprises: an idler arm ball (668A), disposed within an idler socket (606A) of the idler arm (472); and an idler arm shaft (696A), coupled to the idler attachment (414).

Clause 18. The commercial electric vehicle (100) of clause 17, wherein the idler socket (606A) comprises a lip (674A) configured to allow less than 2 degrees of angular rotation (688) for the idler arm ball joint (452).

Clause 19. The commercial electric vehicle (100) of clause 16, wherein the pitman arm ball joint (450) comprises: a pitman arm ball (668B), disposed within a pitman socket (606B) of the pitman arm (470); and a pitman arm shaft (696B), coupled to the pitman attachment (412).

Clause 20. The commercial electric vehicle (100) of clause 11, wherein at least a portion of the stud shaft (692) is non-tapered.

DETAILED DESCRIPTION

Figure 1:
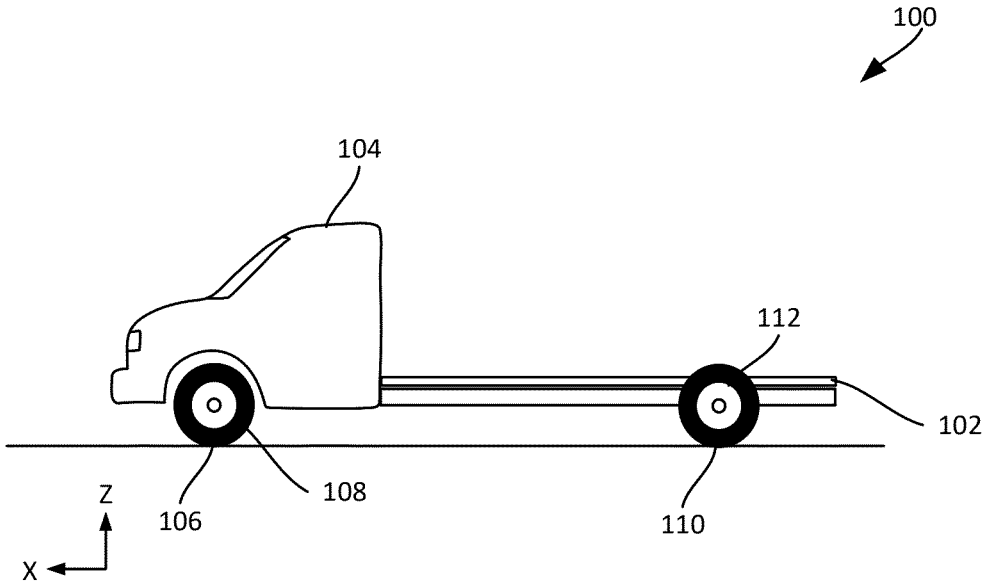
FIG. 1 illustrates a side view of a commercial electric vehicle, in accordance with certain embodiments.

In the following description, numerous specific details are outlined to provide a thorough understanding of the presented concepts. The presented concepts may be practiced without some or all of these specific details. In other instances, well-known process operations have not been described in detail to not unnecessarily obscure the described concepts. While some concepts will be described in conjunction with the specific embodiments, it will be understood that these embodiments are not intended to be limiting.

It is to be appreciated that the electric vehicles described herein may include both a left and a right side. In certain figures, for simplicity purposes, element numbers may be provided for only components on one side of the vehicle. However, it is appreciated that such elements, and description provided herein, may also be disposed and/or apply on the other side of the vehicle (e.g., as illustrated in the accompanying figures). In such figures, elements on one lateral side may include an ordinal indicator and a letter (e.g., "idler socket 606A") while the equivalent elements on the other lateral side may include the same ordinal indicator, but a different letter (e.g., "pitman socket 606B").

It is appreciated that, for the purposes of this disclosure, when an element includes a plurality of similar elements distinguished by a letter following the ordinal indicator (e.g., "606A" and "6060B") and reference is made to only the ordinal indicator itself (e.g., "606"), such a reference is applicable to all the similar elements.

As described herein, "coupled to" may refer to an element that is directly or indirectly connected to another element. Such elements may be coupled via any appropriate permanent (e.g., unremovable without destruction), semi-permanent (e.g., removable through removal of other components), and/or temporary (e.g., directly removable) technique. Elements that are coupled together may be coupled in a fixed or movable relationship.

The vehicle and components described herein may be referred to in a standardized coordinate system. That is, positioning of the components of the vehicle may be defined as longitudinally along the X axis shown in the figures, laterally along the Y axis shown in the figures, and height wise along the Z axis shown in the figures.

Introduction

Commercial vehicles typically utilize recirculating ball steering systems. However, such systems are generally inaccurate and are nonlinear in their motion. Therefore, such steering systems tend to require correction and are not as intuitive to use as rack and pinion steering systems.

Described herein are commercial electric vehicles (EVs) steering systems that utilize a recirculating ball steering system with a fixed height idler that allows for control of a track rod to mimic the geometry of a rack and pinion steering system. The fixed height idler utilizes ball joints for distance control. Such a configuration allows for a superior steering experience for a commercial electric vehicle.

Vehicle Examples

FIG. 1 illustrates a vehicle, in accordance with certain embodiments. FIG. 1 illustrates vehicle 100 that includes chassis 102, cab 104, front tire 106, front wheel 108, rear tire 110, and rear wheel 112. In certain embodiments, vehicle 100 may be a commercial vehicle with electric propulsion. The front of vehicle 100 may be defined as the forward end (e.g., the end of vehicle 100 that is closer to front wheel 108 than rear wheel 112) and the rear of vehicle 100 may be defined as the rearward end (e.g., the end of vehicle 100 that is closer to rear wheel 112 than front wheel 108).

Vehicle 100 may represent any type of commercial vehicle, such as a vehicle with an integrated cargo volume, (e.g., a delivery van or a box truck), a flatbed truck, a pickup truck, a truck with an enclosed cargo box, a towing vehicle, and/or any other such commercial vehicle. Chassis 102 may be any type of appropriate chassis, such as a ladder frame, unibody, monocoque, semi-monocoque, and/or other such type of chassis that may allow for vehicle 100 to provide load-carrying and/or towing ability. Though not illustrated in FIG. 1, vehicle 100 may additionally include one or more of a flatbed, truck bed, cargo container, cabin, and/or other compartment for carrying loads and/or performing tasks. In certain embodiments, vehicle 100 may be powered by one or more electric drive units (e.g., electric motors and drivetrains for the electric motors) that are mounted in various portions of vehicle 100. For example, vehicle 100 may mount one or more electric motors in front of tire 110 and wheel 112, within the frame rails of 102, and/or within another portion of vehicle 100. In certain embodiments, vehicle 100 may be pure electric (e.g., only powered by one or more electric drive units) or may include a combustion motor for range extension, as an auxiliary power source, and/or as an alternative drive unit.

Chassis Examples

Figure 2:
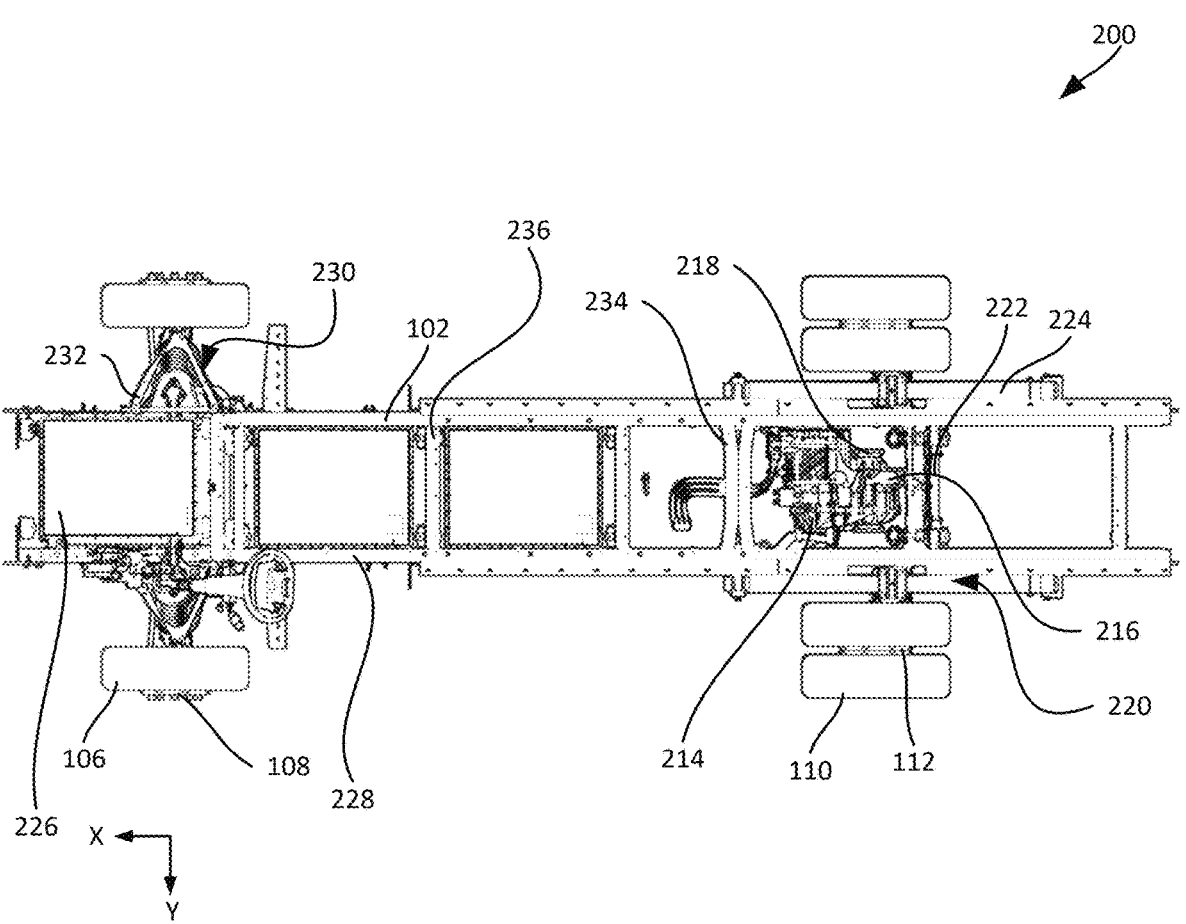
FIG. 2 illustrates a top view of a commercial electric vehicle chassis, in accordance with certain embodiments.

FIG. 2 is a top view of a commercial electric vehicle chassis, in accordance with certain embodiments. FIG. 2 illustrates vehicle architecture 200 which includes chassis 102, front tire 106, front wheel 108, rear tire 110, rear wheel 112, electric motor 214, drivetrain 216, CV axle 218, rear suspension 220, battery 226, and front suspension 230. Chassis 102 includes frame rails 228, crossmembers 234, and crossmembers 236. Rear suspension 220 includes de Dion axle 222 and leaf spring 224. Front suspension 230 includes control arm 232. Drivetrain 216 is coupled to electric motor 214 and configured to output power produced by electric motor 214 to rear wheel 112 via CV axle 218. Drivetrain 216 and electric motor 214 may form an electric drive unit.

In various embodiments, electric motor 214 may be any type of electrified (e.g., pure electric or hybrid) drive unit that is configured to power and provide at least partially electrified propulsion to vehicle 100 (which vehicle architecture 200 may be a portion thereof). Thus, electric motor 214 may be, for example, any type of direct current (DC) or alternating current (AC) electric motor that may provide motive force. The motive force may be transmitted via drivetrain 216, which may be a direct drive, a gear reduction, and/or a multi-speed transmission or transaxle. Drivetrain 216 may include an output shaft or cavity that may be configured to receive a portion of CV axle 218 and provide motive force to CV axle 218.

As shown in FIG. 2, electric motor 214 and/or drivetrain 216 may be disposed proximate to rear wheel 112. As shown in FIG. 2, electric motor 214 and drivetrain 216 are disposed in front of de Dion axle 222. CV axle 218 may transmit motive force from drivetrain 216 to rear wheel 112. Such a configuration may not include a propshaft or other driveshaft that couples electric motor 214 and/or drivetrain 216 with CV axle 218. Instead, drivetrain 216 may be a transaxle and CV axle 218 may transit motive force in the lateral (y) direction, while no driveshafts are oriented in the longitudinal (x) direction.

CV axle 218 allows for motive force to be transmitted from drivetrain 216 to rear wheel 112 while there is a degree of misalignment between drivetrain 216 and rear wheel 112 (e.g., the CV cups of CV axle 218 may operate at a misalignment angle). CV axle 218 allows for electric motor 214 and drivetrain 216 to be mounted to chassis 102 without the use of a Hotchkiss drive to transmit torque to rear tire 110. Otherwise, such a Hotchkiss drive may take up space between frame rails 228 of chassis 102 and result in parasitic losses and, thus, decrease efficiency. Furthermore, disposing of electric motor 214 and/or drivetrain 216 on an axle (e.g., live axle) of vehicle architecture 200 may subject electric motor 214 and/or drivetrain 216 to unacceptably high levels of bumps and vibration, increasing the likelihood of failure and decreasing reliability. For vehicle architecture 200, electric motor 214 and drivetrain 216 are mounted to chassis 102 (instead of to rear suspension 220) to improve reliability and isolate electric motor 214 and drivetrain 216 from shocks from, for example, bumps and other operating shocks and vibrations and, thus, avoid the disadvantages of mounting electric motor 214 and/or drivetrain 216 to a live axle.

CV axle 218 allows for electric motor 214 and drivetrain 216 to be disposed on chassis 102 while powering rear wheel 112. CV axles typically operate most reliably when the misalignment angle is as low as possible. CV axles are also generally utilized in independent suspension arrangements, which do not have the load carrying capacity of a beam axle (e.g., live or dead axle) type suspension. For vehicle architecture 200, rear suspension 220 includes de Dion axle 222. De Dion axle 222 may be curved in one or more axes to allow for electric motor 214 and/or drivetrain 216 to be disposed close to the axle centerline (e.g., the axle centerline of the rear wheels may intersect at least a portion of electric motor 214 and/or drivetrain 216) to minimize the misalignment angle of CV axle 218. Such a configuration may allow for the load carrying capacity of a beam axle while avoiding the need for a central propshaft to transfer propulsive force by disposing electric motor 214 and/or drivetrain 216 proximate to rear wheel 112 in a transaxle configuration. The elimination of the central propshaft provides space for packaging, such as space for batteries to be disposed between the frame rails 228 of chassis 102.

Battery 226 may provide electrical power to electric motor 214. Thus, battery 226 may store electrical charge that may be communicated to electric motor 214 and power electric motor 214 such that electric motor 214 generates rotational force. Battery 226 may include one or a plurality of battery packs that may each include one or a plurality of battery modules. Battery 226 may be any type of battery appropriate for powering an electrified vehicle, such as nickel metal hydride, lithium ion, lithium iron phosphate, and/or other such types of batteries.

Due to the location of electric motor 214 and drivetrain 216 of vehicle architecture 200, various packs of battery 226 may be disposed within frame rails 228 of chassis 102. In a typical configuration with a driveshaft such as a Hotchkiss drive, the driveshaft would be disposed within the space between frame rails 228, preventing one or more packs of battery 226 from being disposed within frame rails 228. Furthermore, the front suspension and steering gear and/or a front mounted motor would be disposed in the space within frame rails 228 between the front wheels. In various embodiments of vehicle architecture 200, packs of battery 226 may be disposed both in front of (e.g., towards the front of the vehicle) and behind (e.g., towards the rear of the vehicle) electric motor 214 and/or drivetrain 216. Additionally, one or more packs of battery 226 may be disposed between portions of front suspension 230.

Vehicle architecture 200 provides packaging benefits by disposing battery 226, electric motor 214, and drivetrain 216 within the frame rails of chassis 102. Accordingly, all or the majority of the main motive components of vehicle architecture 200 may be disposed between the frame rails of chassis 102, providing protection for such elements.

A typical commercial vehicle utilizes a beam axle front suspension. The beam axle front suspension requires that the floor of the frame of the vehicle be elevated in order to provide space for movement of the beam axle (e.g., due to bumps, roll, and/or other suspension movement). The elevated floor renders the space above the front suspension unsuitable for battery packaging or at least would lead to an undesirable increase in center of gravity height if batteries were disposed in that location, as well as decreasing crash protection and resulting in various other undesirable vehicle characteristics.

Front suspension 230 of vehicle architecture 200 utilizes independent front suspension that includes one or more control arm 232. In certain embodiments, front suspension 230 may be a double wishbone or control arm suspension that includes an upper control arm and a lower control arm. Other embodiments of front suspension 230 may include strut, multi-link, swing arm, trailing arm, and/or other types of independent front suspension.

Independent front suspension 230 allows for a low load floor and for batteries to be disposed in the portion of frame rails 228 between front suspension 230. Such batteries may be disposed at a low height, as no portion of front suspension 230 may be located within frame rails 228 or require raising of frame rails 228 proximate to front suspension 230. Furthermore, the independent configuration of front suspension 230 allows for a passenger vehicle like driving experience, reducing the need for driver training for driving commercial electric vehicle 100 and, thus, increasing the available driver pool and mitigating against potential driver shortages.

Furthermore, such a configuration may allow for the mounting of a plurality of battery packs between front suspension 230. The packs may be at least partially stacked one above another. The lowest battery pack is mounted low between front suspension 230. The positioning of such a battery pack may mitigate the center of gravity effects of the higher mounted pack. Furthermore, the configuration of vehicle architecture 200 may allow for such a stacking arrangement, which may not be possible in a convention architecture with a beam axle suspension. Mounting a plurality of battery packs between front suspension 230 may shift the weight distribution of vehicle 100 forward and such a forward shift in weight distribution may allow for an increase in payload of vehicle 100, which is important for commercial vehicles where payload determines the usefulness of the vehicle. Conversely, for architectures where battery packs are only mounted behind the front axle, the weight distribution of the vehicle may be shifted too far rearward to allow for safe handling with an equivalent payload as that of vehicle architecture 200, requiring a decrease in rated payload.

The various configurations and features of vehicle architecture 200 may be further described herein.

Figure 3:
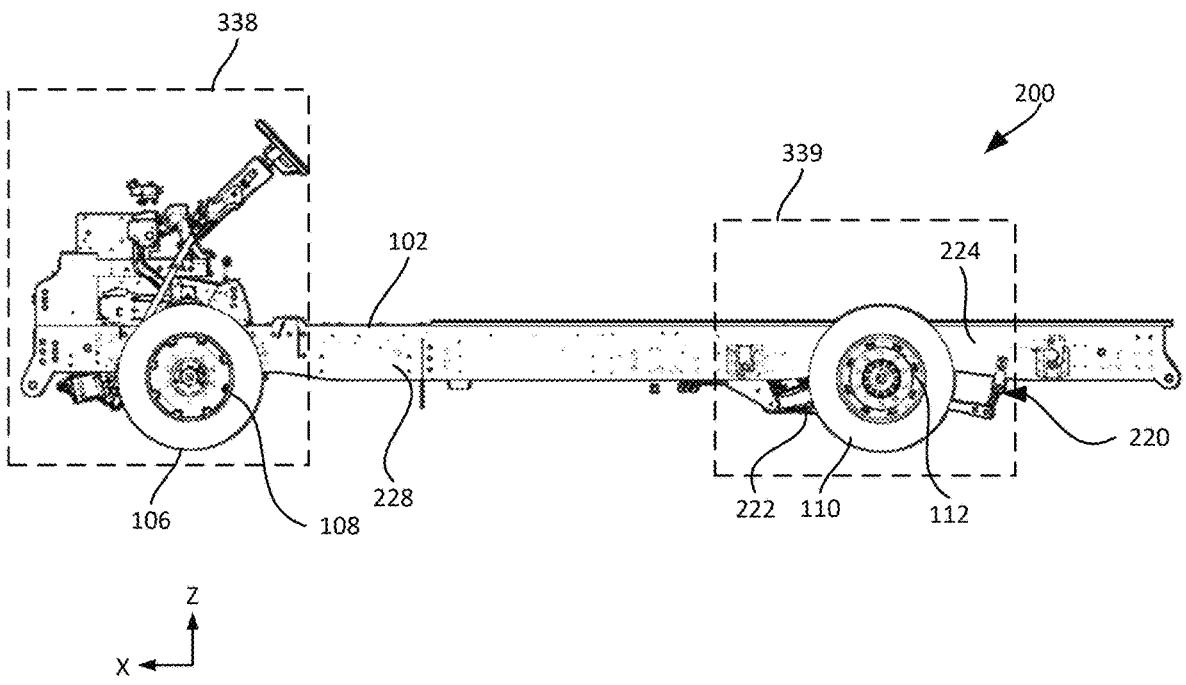
FIG. 3 illustrates a side view of a commercial electric vehicle chassis, in accordance with certain embodiments.

FIG. 3 illustrates a side view a commercial electric vehicle chassis, in accordance with certain embodiments. FIG. 3 is a partial side view of vehicle architecture 200. As shown in FIG. 3, vehicle architecture 200 may include front suspension area 338 and rear suspension area 339. In certain embodiments, rear suspension 220 may be disposed within rear suspension area 339 and front suspension 230 (not shown in FIG. 3, but shown in FIG. 2) may be disposed within front suspension area 338.

As described herein, due to the independent configuration of front suspension 230, the portion of frame rails 228 ("first portion" of frame rails 228) within front suspension area 338 may be level or substantially level with that of the majority of frame rails 228 (e.g., the portions that span the majority of the distance between front wheel 108 and rear wheel 112). That is, the bottom of frame rails 228 disposed within front suspension area 338 may be colinear or may be linearly in line with the majority of other portions of frame rails 228 (e.g., the portions that span the majority of the distance between front wheel 108 and rear wheel 112). Thus, unlike what is required when utilizing a beam axle front suspension, frame rails 228 within front suspension area 338 do not need to be raised.

The portion of frame rails 228 ("second portion" of frame rails 228) within rear suspension area 339 may be notched due to the configuration of the rear suspension 220. As rear suspension 220 includes a beam axle (e.g., de Dion axle 222), chassis 102 (e.g., frame rails 228) are shaped so that movement of the beam axle does not result in contact with that of frame rails 228. Accordingly, the bottom portion of frame rails 228 within rear suspension area 339 is notched to prevent contact with de Dion axle 222. The floor of vehicle 100 utilizing vehicle architecture 200 may, thus, be operated at a lower ride height or include a lower floor height (e.g., due to the lower height of frame rails 228), decreasing cargo lift height. Additionally, notching of frame rails 228 within rear suspension area 339 allows for the CV axles coupled to drivetrain 216 to be operated at a lower vertical misalignment angle or no misalignment angle at all (at a certain load and static ride height), increasing the longevity of the CV axles.

Steering Examples

Figure 4:
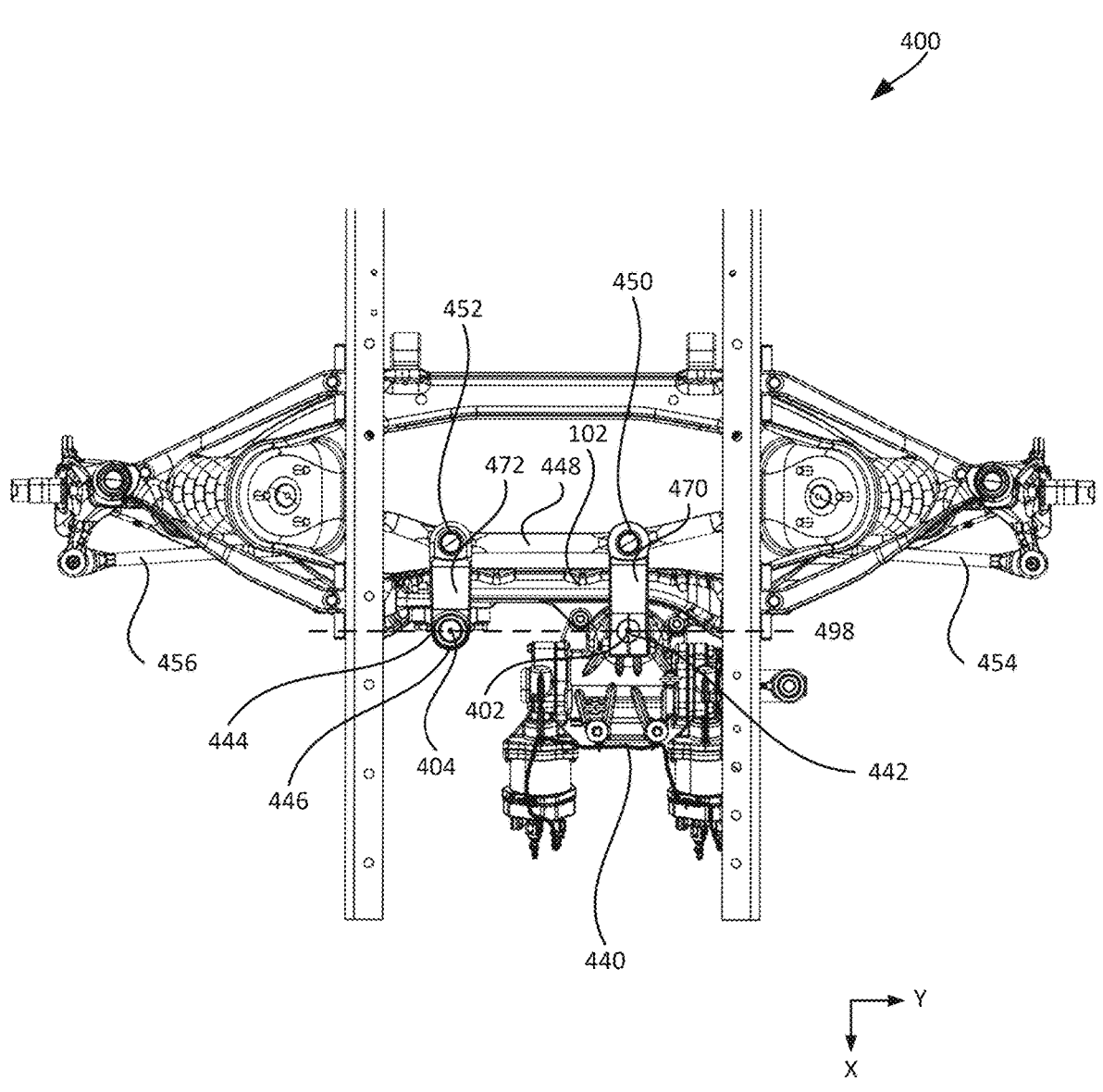
FIG. 4 illustrates a top view of a commercial electric suspension system, in accordance with certain embodiments.
Figure 5:
FIG. 5 illustrates a top view of a commercial electric vehicle steering system, in accordance with certain embodiments.
Figure 5:
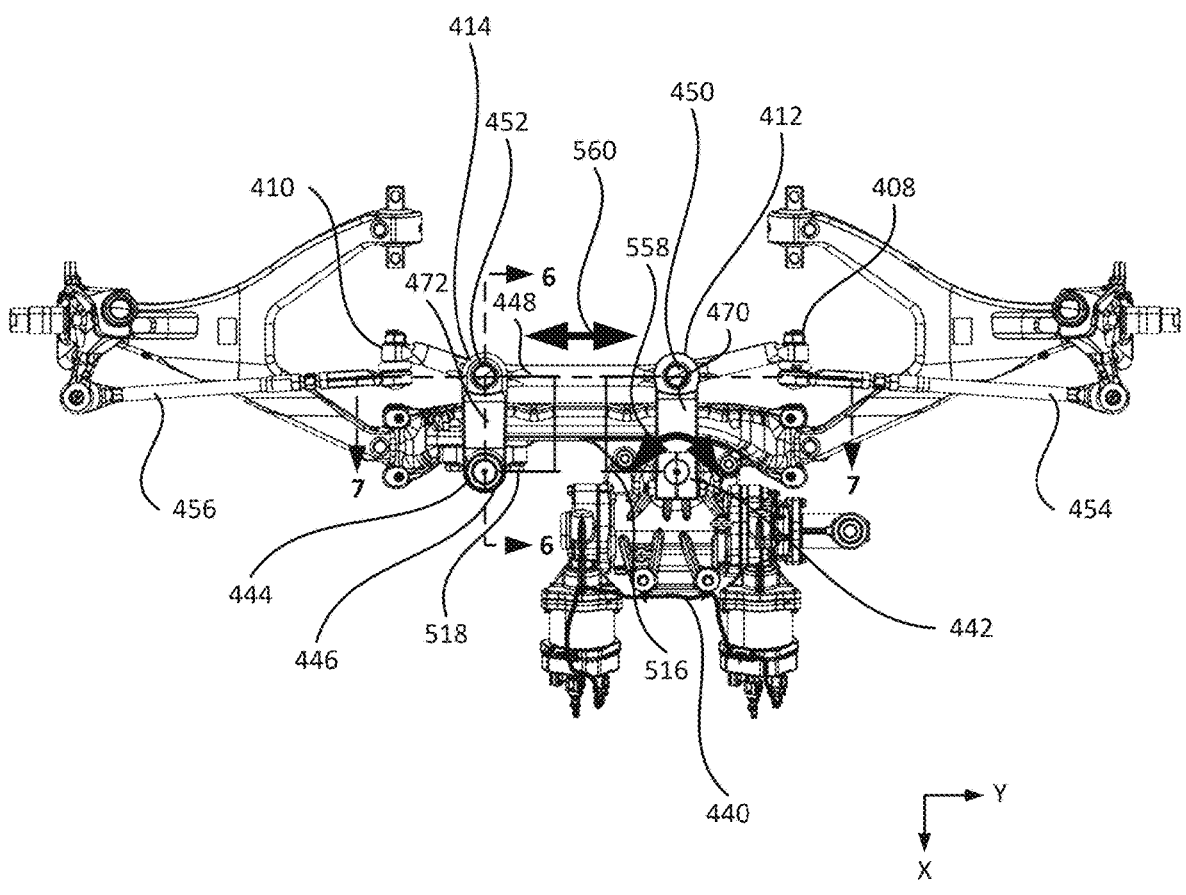

FIG. 4 illustrates a top view of a commercial electric suspension system, in accordance with certain embodiments. FIG. 4 illustrates first suspension 400, which may include certain (but possibly not all) components of front suspension 230. FIG. 5 illustrates a top view of a commercial electric vehicle steering system, in accordance with certain embodiments. FIG. 5 illustrates commercial electric vehicle steering system 500, which may be the steering system (including recirculating ball steering unit 440) of first suspension 400.

First suspension 400 may include a commercial electric vehicle steering system, including recirculating ball steering unit 440 coupled to track rod 448 via pitman arm 470 and steering idler 444 coupled to track rod 448 via idler arm 472. Track rod 448 may be coupled to first tie rod 454 on a first end 408 of track rod 448 and coupled to second tie rod 456 on a second end 410 of track rod 448. First tie rod 454 and second tie rod 456 may be coupled to respective uprights and configured to cause the respective uprights to rotate to turn wheels coupled to the uprights.

In various embodiments, recirculating ball steering unit 440 and steering idler 444 may be coupled to a portion of chassis 102, such as one or more cross members of chassis 102. In certain embodiments, recirculating ball steering unit 440 and steering idler 444 may be coupled to the same cross member.

Variously, recirculating ball steering unit 440 may be a recirculating ball steering rack that includes rotatable output shaft 442. Thus, an operator of vehicle 100 may turn a steering wheel, which may then operate the recirculating ball steering unit 440 to provide an output via rotatable output shaft 442. Rotational motion of the steering wheel of vehicle 100 may thus result in rotational motion 558 of rotatable output shaft 442 about output axis 402. Accordingly, rotatable output shaft 442 may be configured to rotate about output axis 402.

Pitman arm 470 may couple rotatable output shaft 442 to track rod 448. Thus, pitman arm 470 may be coupled to rotatable output shaft 442 and coupled to track rod 448 at pitman attachment 412. In certain embodiments, pitman attachment 412 may be disposed between first end 408 and second end 410 of track rod 448.

Thus, pitman arm 470 may be coupled to rotatable output shaft 442 and include a rotational pitman arm ball joint 450. Output axis 402 of rotatable output shaft 442 and the center axis of pitman arm ball joint 450 may be disposed a first distance 516 apart.

Steering idler 444 and idler arm 472, in combination with pitman arm 470, allows for the location of track rod 448 to be fully controlled. Steering idler 444 may include steering idler ball joint 446, which may be further described in FIG. 6. Steering idler 444 may not provide rotational torque, but may allow for idler arm 472 to rotate about stud axis 404 of steering idler ball joint 446. Thus, steering idler ball joint 446 may be configured to rotate about stud axis 404. Idler arm 472 may be coupled to steering idler 444 and coupled to track rod 448 at idler attachment 414. Idler attachment 414 may be disposed between first end 408 and second end 410 of track rod 448.

Idler arm 472 may include or be coupled to steering idler ball joint 446 and idler arm ball joint 452. Stud axis 404 of steering idler ball joint 446 and the center axis of idler arm ball joint 452 may be disposed a second distance 518 apart. In certain embodiments, first distance 516 and second distance 518 may be substantially similar (e.g., within +/−5 percent) in distance.

Variously, output axis 402 and stud axis 404 may be substantially laterally in line 498 with each other. That is, output axis 402 and stud axis 404 may be within a distance of 5 inches from each along the lengthwise X-axis of vehicle 100. In certain embodiments, output axis 402 and stud axis 404 may be laterally in line 498 with each other (e.g., a line drawn laterally along the lateral Y-axis of vehicle 100 that intersects one of output axis 402 and stud axis 404 may also intersect the other of output axis 402 and stud axis 404) and, thus, are disposed along the same portion of the length of vehicle 100.

Rotational motion 558 of rotatable output shaft 442 may be converted to linear motion 560 of track rod 448 due to pitman arm 470 and idler arm 472. As pitman arm 470 and idler arm 472 are fixed lengths with substantially similar center to center distances, rotation of rotatable output shaft 442 may cause pitman arm 470 to rotate about output axis 402. Rotation of pitman arm 470 may cause track rod 448 to translate with linear motion 560. Due to the fixed length of idler arm 472 controlling the movement of track rod 448, the majority of the movement component of linear motion 560 is along the Y-axis. Accordingly, the configuration of idler arm 472, pitman arm 470, and track rod 448 mimics the motion of a rack and pinion steering system.

Steering feel of commercial electric vehicle steering system 500 is improved via tight distance control of the linkages. Typically, linkages include bushings when rotationally coupled (e.g., when the linkages are coupled so that one linkage may rotate relative to another linkage). Bushings may allow for radial and axial distance variations. Accordingly, if bushings were used in commercial electric vehicle steering system 500 in lieu of ball joints, the distance between the linkages would not be as tightly controlled. Conversely, the configuration of commercial electric vehicle steering system 500 utilizes ball joints within pitman arm 470 and idler arm 472 to improve directional control along one or more axes.

Figure 6:
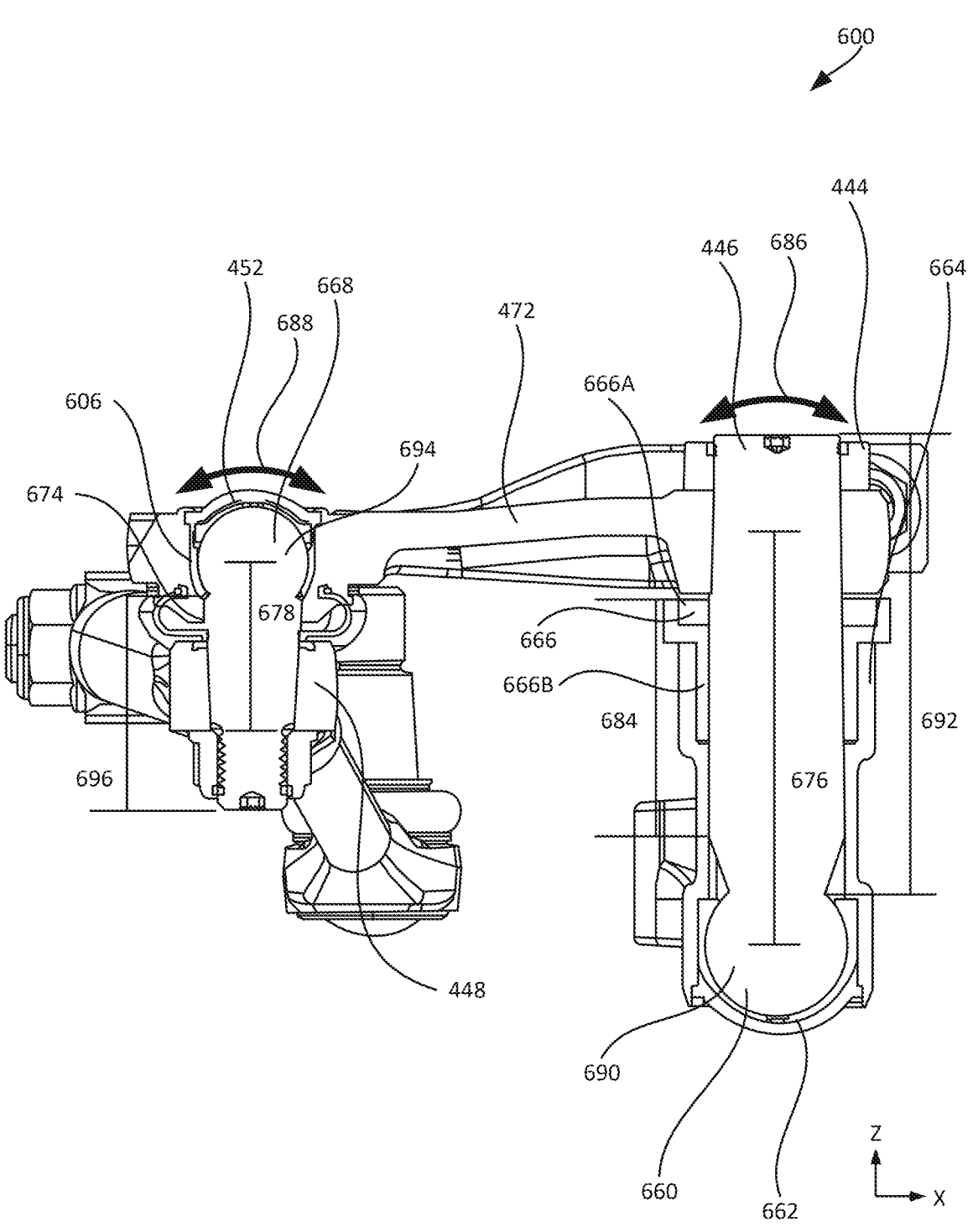
FIG. 6 illustrates a side cutaway view of a portion of a commercial electric vehicle steering system, in accordance with certain embodiments.
Figure 7:
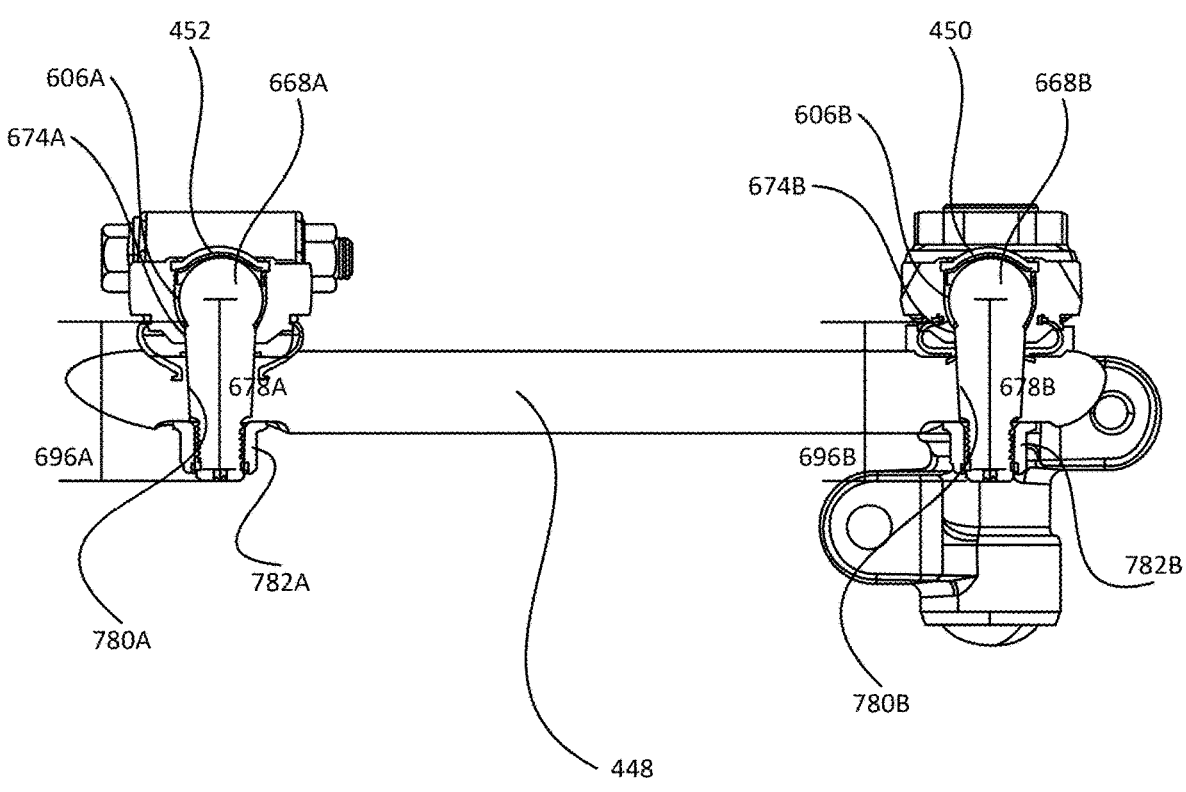
FIG. 7 illustrates a front cutaway view of a portion of a commercial electric vehicle steering system, in accordance with certain embodiments.

FIG. 6 illustrates a side cutaway view of a portion of a commercial electric vehicle steering system, in accordance with certain embodiments. FIG. 6 illustrates cutaway 600, which is a cutaway along plane 6-6 of FIG. 5. FIG. 7 illustrates a front cutaway view of a portion of a commercial electric vehicle steering system, in accordance with certain embodiments. FIG. 7 illustrates cutaway 700, which is a cutaway along plane 7-7 of FIG. 5.

Idler arm 472 is coupled to steering idler 444 via steering idler ball joint 446. Idler arm 472 is coupled to track rod 448 via idler arm ball joint 452. Steering idler 444 may include steering idler ball joint 446 disposed within a substantially cylindrical sidewall 664. Bushing 666 may be coupled to steering idler ball joint 446 to prevent angular rotation 686 of steering idler ball joint 446 relative to sidewall 664.

Accordingly, steering idler ball joint 446 may include idler ball stud 660 disposed within idler ball socket 662. Idler ball stud 660 may include steering idler ball 690 and stud shaft 692. Steering idler ball 690 may be partially spherical and idler ball socket 662 may include a partially spherical interior configured to receive steering idler ball 690. Thus, idler ball socket 662 may be held in a fixed spatial relation relative to sidewall 664.

As idler ball socket 662 is held in a fixed spatial relation relative to sidewall 664, steering idler ball joint 446 may typically angularly rotate relative to sidewall 664 due to the ball joint design. Bushing 666 may be coupled to an outer perimeter of stud shaft 692 of steering idler ball joint 446 and at least a portion of bushing 666 may be coupled to an inner portion of sidewall 664. Thus, bushing 666 may be configured to contact both steering idler ball joint 446 and sidewall 664 and prevent angular rotation 686 of steering idler ball joint 446 relative to sidewall 664. As such, though a ball joint is utilized, the combination of bushing 666 coupled to steering idler ball joint 446 prevents all rotation of steering idler ball joint 446.

In certain such embodiments, bushing 666 may include first bushing portion 666A and second bushing portion 666B. First bushing portion 666A may be press fit onto steering idler ball joint 446 and disposed into an interior cavity of second bushing portion 666B or sidewall 664. Second bushing portion 666B may be disposed within an interior cavity of sidewall 664. As such, idler ball stud 660 may be configured to rotate relative to sidewall 664. Portion 684 of idler ball stud 660 may be a linear portion, to prevent contact between idler ball stud 660 and sidewall 664.

Steering idler ball joint 446 may be coupled to idler arm 472. In certain embodiments, idler arm 472 may be mechanically coupled to steering idler ball joint 446 (e.g., attached via a fastener, such as a fastener threaded onto a thread of a portion of steering idler ball joint 446), may be frictionally coupled (e.g., press fit) to steering idler ball joint 446, may be permanently coupled (e.g., welded) to steering idler ball joint 446, and/or coupled via another such technique.

In a certain embodiment, steering idler ball joint 446 may be coupled to chassis 102 closer to idler ball stud 660 of steering idler ball joint 446. Thus, for example, idler ball socket 662 may be disposed proximate to a portion of chassis 102 (e.g., a portion of idler ball socket 662 may be disposed along X-axis of a portion of chassis 102). Thus, steering idler ball joint 446 may be coupled to chassis 102 in a manner where idler ball socket 662 is closer to chassis 102 than, for example, stud shaft 692. A typical configuration with a bushing may allow for idler arm 472 to move vertically (e.g., along the Z-axis) relative to where steering idler ball joint 446 is coupled to chassis 102.

Conversely, steering idler ball joint 446 allows for tight distance control between idler arm 472 and idler ball socket 662. Thus, for example, the distance between the center of steering idler ball 690 and idler arm 472 may be defined by distance 676. Steering idler ball joint 446 allows for tight control of distance 676, preventing variation in distance 676.

However, a ball joint provides angular rotation (e.g., angular rotation 686). Bushing 666 prevents such angular rotation, allowing for superior spatial control of the components of commercial electric vehicle steering system 500.

Similarly, idler arm 472 is coupled to track rod 448 via idler arm ball joint 452. Idler arm ball joint 452 includes arm ball stud 668 that includes arm ball 694 and arm shaft 696. Arm ball 694 may be disposed within arm ball socket 606. As shown in FIGS. 6 and 7, arm ball 694 and arm ball socket 606 may be coupled to idler arm 472 while an end of arm shaft 696 is coupled to track rod 448, but it is appreciated that other embodiments may couple arm ball 694 and arm ball socket 606 to track rod 448 and couple arm shaft 696 to idler arm 472. In various such embodiments, the portion of arm shaft 696 may be coupled to idler arm 472 or track rod 448 via mechanical, frictional, permanently, or coupled via any other such technique.

Arm ball stud 668 may allow for tight distance control (e.g., along Z-axis) between idler arm 472 and track rod 448. Thus, arm ball stud 668 allows for tight control of distance 678, which may be the distance between a center of arm ball 694 and track rod 448.

In certain such embodiments, idler arm ball joint 452 may allow for angular rotation 688 due to arm ball 694. A certain amount of such rotational may be needed as the configuration of commercial electric vehicle steering system 500 may cause track rod 448 to move along more than one axis, due to geometric constraints. Arm ball socket 606 may thus include lip 674. Lip 674 may be configured to allow for a limited amount of rotation for idler arm ball joint 452. In certain such embodiments, lip 674 may be configured allow arm ball stud 668 to rotate by 2 degrees or less relative to idler arm 472. Such a limited amount of rotation may allow for idler arm ball joint 452 to accommodate the movement of track rod 448, but not allow over rotation.

As shown in FIG. 7, both pitman arm ball joint 450 and idler arm ball joint 452 may include arm ball studs, specifically pitman arm ball 668B and idler arm ball 668A as well as pitman arm shaft 696B and idler arm shaft 696A, respectively. As shown in FIG. 7, fastener 782 may couple arm shaft 696 to track rod 448 and hold arm shaft 696 in a fixed spatial relation to track rod 448.

In certain such embodiments, arm shaft 696 may be disposed within opening 780 of 448. Various embodiments of opening 780 may include straight or tapered openings, to further keep arm shaft 696 in a fixed spatial relationship to track rod 448.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. A commercial electric vehicle steering system comprising:

a recirculating ball steering unit, configured to be coupled to a commercial electric vehicle frame and comprising a rotatable output shaft configured to rotate around an output axis;

a first tie rod;

a second tie rod;

a track rod, comprising:

a first end coupled to the first tie rod;

a second end coupled to the second tie rod;

a pitman attachment, disposed between the first end and the second end; and an idler attachment, disposed between the first end and the second end;

a pitman arm, coupled to the rotatable output shaft and the pitman attachment;

an idler arm, coupled to the idler attachment; and a steering idler, comprising:

a steering idler ball joint comprising:

an idler ball stud, configured to couple to the commercial electric vehicle frame and comprising a steering idler ball; and a stud shaft, the stud shaft coupled to the idler arm and configured to rotate around a stud axis, the stud axis disposed substantially laterally in line with the output axis;

a substantially cylindrical sidewall, enclosing at least a portion of the stud shaft; and a bushing, coupled to the stud shaft and the substantially cylindrical sidewall, containing an outside diameter of the stud shaft, and configured to prevent angular rotation of the idler ball stud.

2. The commercial electric vehicle steering system of claim 1, wherein the steering idler ball joint further comprises an idler ball socket, wherein the steering idler ball is disposed within the idler ball socket.

3. The commercial electric vehicle steering system of claim 2, wherein the idler ball socket is configured to be disposed proximate the commercial electric vehicle frame.

4. The commercial electric vehicle steering system of claim 1, wherein the idler arm is coupled to the idler attachment with an idler arm ball joint.

5. The commercial electric vehicle steering system of claim 4, wherein a first distance between the output axis and the pitman attachment is substantially similar to a second distance between the stud axis and the idler attachment.

6. The commercial electric vehicle steering system of claim 5, wherein the pitman arm is coupled to the pitman attachment with a pitman arm ball joint.

7. The commercial electric vehicle steering system of claim 6, wherein the idler arm ball joint comprises:

an idler arm ball, disposed within an idler socket of the idler arm; and an idler arm shaft, coupled to the idler attachment.

8. The commercial electric vehicle steering system of claim 7, wherein the idler socket comprises a lip configured to allow less than 2 degrees of angular rotation for the idler arm ball joint.

9. The commercial electric vehicle steering system of claim 6, wherein the pitman arm ball joint comprises:

a pitman arm ball, disposed within a pitman socket of the pitman arm; and a pitman arm shaft, coupled to the pitman attachment.

10. The commercial electric vehicle steering system of claim 1, wherein at least a portion of the stud shaft is non-tapered.

11. A commercial electric vehicle comprising:

a commercial electric vehicle frame;

a first suspension, comprising:

a first tie rod;

a second tie rod; and a commercial electric vehicle steering system, comprising:

a recirculating ball steering unit, coupled to the commercial electric vehicle frame and comprising a rotatable output shaft configured to rotate around an output axis;

a track rod, comprising:

a first end coupled to the first tie rod;

a second end coupled to the second tie rod;

a pitman attachment, disposed between the first end and the second end; and an idler attachment, disposed between the first end and the second end;

a pitman arm, coupled to the rotatable output shaft and the pitman attachment;

an idler arm, coupled to the idler attachment; and a steering idler, comprising:

a steering idler ball joint comprising:

an idler ball stud, coupled to the commercial electric vehicle frame and comprising a steering idler ball; and a stud shaft, the stud shaft coupled to the idler arm and configured to rotate around a stud axis, the stud axis disposed substantially laterally in line with the output axis;

a substantially cylindrical sidewall, enclosing at least a portion of the stud shaft; and a bushing, coupled to the stud shaft and the substantially cylindrical sidewall, containing an outside diameter of the stud shaft, and configured to prevent angular rotation of the idler ball stud.

12. The commercial electric vehicle of claim 11, wherein the steering idler ball joint further comprises an idler ball socket, wherein the steering idler ball is disposed within the idler ball socket.

13. The commercial electric vehicle of claim 12, wherein the idler ball socket is disposed proximate the commercial electric vehicle frame.

14. The commercial electric vehicle of claim 11, wherein the idler arm is coupled to the idler attachment with an idler arm ball joint.

15. The commercial electric vehicle of claim 14, wherein a first distance between the output axis and the pitman attachment is substantially similar to a second distance between the stud axis and the idler attachment.

16. The commercial electric vehicle of claim 15, wherein the pitman arm is coupled to the pitman attachment with a pitman arm ball joint.

17. The commercial electric vehicle of claim 16, wherein the idler arm ball joint comprises:

an idler arm ball, disposed within an idler socket of the idler arm; and an idler arm shaft, coupled to the idler attachment.

18. The commercial electric vehicle of claim 17, wherein the idler socket comprises a lip configured to allow less than 2 degrees of angular rotation for the idler arm ball joint.

19. The commercial electric vehicle of claim 16, wherein the pitman arm ball joint comprises:

a pitman arm ball, disposed within a pitman socket of the pitman arm; and a pitman arm shaft, coupled to the pitman attachment.

20. The commercial electric vehicle of claim 11, wherein at least a portion of the stud shaft is non-tapered.

* * * * *